Patented Oct. 15, 1946

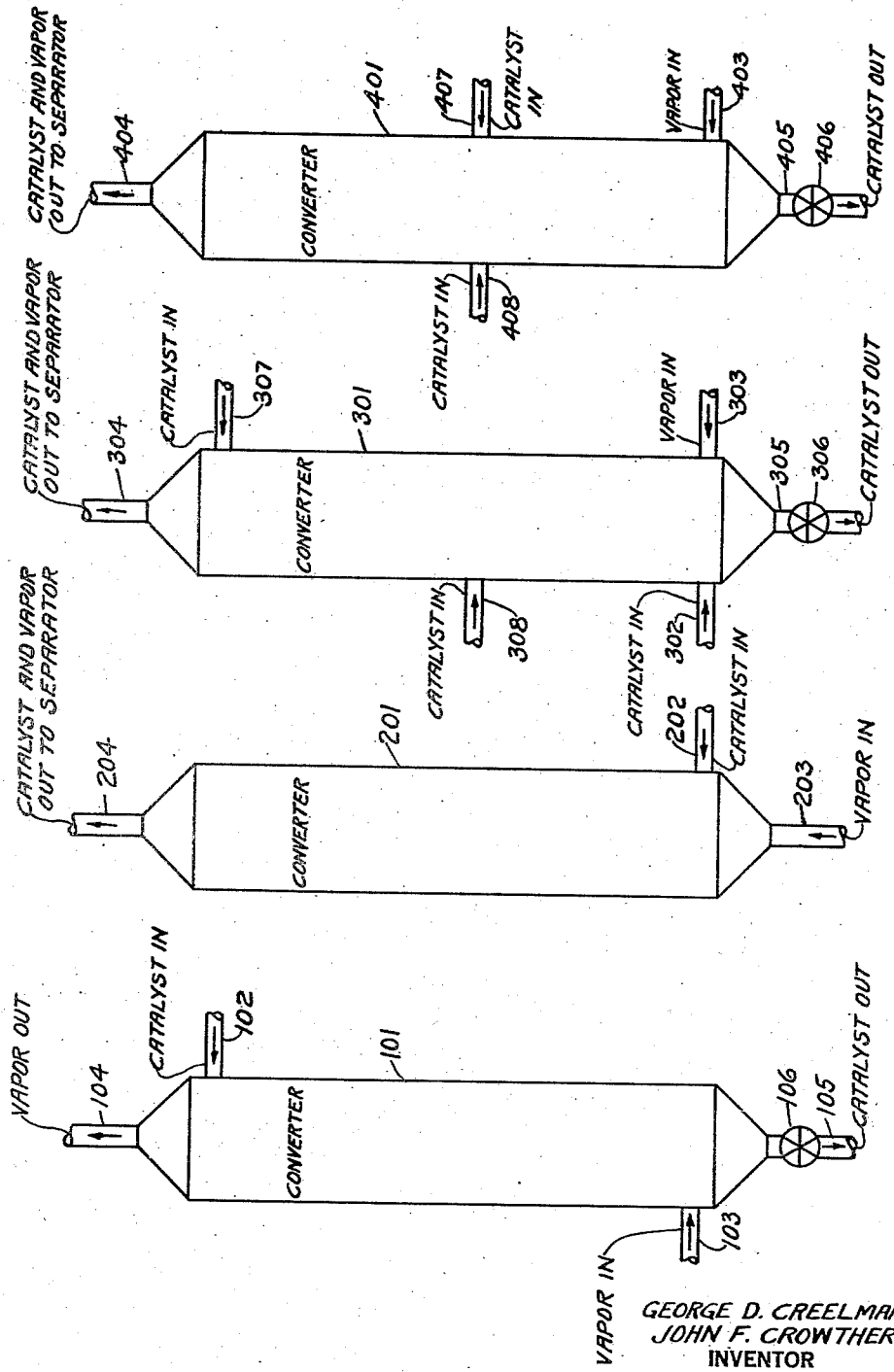

2,409,476

UNITED STATES PATENT OFFICE 2,409,476

CONTACTING SOLIDS WITH VAPORS

George D. Creelman, Mountain Lakes, N. J., and John F. Crowther, Mount Vernon, N. Y., assignors to The M. W. Kellogg Company, Jersey City, N. J., a corporation of Delaware Application July 19, 1940, Serial No. 346,270

6 Claims. (Cl. 196—52)

Our invention relates to catalytic vapor phase reactions and more particularly to a method of conducting such reactions when two catalytic materials of different properties are employed.

In any catalytic conversion operation, it is fundamental that the quantity and activity of the catalyst in the conversion zone must be suited to the extent of conversion desired and the quantity of material to be subjected to conversion. Our invention especially pertains to vapor phase conversions effected by passing vapors through a conversion zone in the presence of suspended particles of two different catalytic materials, there being a continuous transfer of each of the said materials into and out of the conversion zone; and its chief object is the provision of a method whereby, in a conversion operation of the latter type, the quantity of each of the catalytic materials constantly present in the conversion zone may be independently fixed at any value desired, irrespective of the rate at which that material is being transferred into and out of the zone. Transfer of catalytic material in and out of a conversion zone is occasioned by the fact that most catalysts lose their activity to some extent after they have performed a certain amount of service, and must be replaced with new or revivified material.

We attain the objects of our invention primarily by adjustment of the size of the particles into which each of the two catalysts is subdivided, which in turn enables us to establish differences in the rates, directions and distances of movement of the catalysts in the conversion zone.

When catalyst particles are allowed to settle through a moving body of gas, their absolute movement (relative to fixed points) is determined by the vector sum of their settling rates relative to the gas and the rate of movement of the gas. Other things being equal, their settling rates and hence their absolute movements are directly proportional to their diameters and their densities. Pursuant to our invention we adjust the size of catalyst particles, which determines their settling rate; this in turn determines their rate of travel through a conversion zone, and finally the amount of catalyst constantly present in that zone. We apply this chain of control to each of two catalytic materials, and are thereby enabled to maintain any desired quantities of the two catalysts in a conversion zone irrespective of the rates at which they are introduced and withdrawn.

In certain embodiments of our invention, we adjust the particle sizes and settling rates of two catalysts so that the directions of movement of the two catalysts in a conversion zone will be different. Because of the difference in direction we are able to make the distances travelled by the catalysts also different, and thereby provide additional control of zonal quantities, for at any given rate of travel, the greater the distance between the point of introduction and the point of withdrawal, the greater the quantity of catalyst enroute between those points. It will be understood that only by moving the two catalysts in different directions can they be withdrawn separately and at different points.

A process to which our invention is particularly advantageously applied is the preparation of high octane motor fuel from hydrocarbon oils of wide boiling range, and our invention will now be described with particular reference thereto. It is to be understood, however, that this is for purposes of illustration only and in no way limits the scope of our invention.

It has been found that hydrocarbon oils boiling appreciably above 450° F. can be converted into high octane gasoline by catalytic cracking, employing catalysts such as natural and synthetic clays and hydrous oxide gels containing silica and alumina. Naphthas boiling below 450° F. and on down into the gasoline range are not efficiently improved in octane number by the usual cracking catalysts, however, and it is preferable to treat them with a catalyst of the reforming or dehydrogenation type, of which chromium oxide and molybdenum oxide are well known examples. In general, cracking catalysts are more active and have shorter lives than reforming catalysts. In the embodiment of our invention now to be described it is proposed to subject vapors of a hydrocarbon oil boiling between about 300° and 600° F. to the simultaneous action of a cracking catalyst and a reforming catalyst, to maintain in the conversion zone amounts of the two catalysts which are inversely proportional to their activities, and to replace these amounts continuously as fast as their activities become impaired.

Referring now to the annexed drawing, Figure 1 is a simplified diagram of a portion of the equipment employed in the aforementioned process including means for handling the catalysts and material to be converted in the vicinity of the conversion zone.

Figure 2 is an alternate construction diagram showing differently arranged elements of equipment for handling the catalyst and material to be converted, and Figures 3 and 4 show other arrangements suitable for other and similar embodiments of the invention.

In Figure 1, 101 is an elongated vessel disposed vertically and provided with an inlet 102 near the top for the introduction of subdivided catalytic material. A similar inlet 103 is provided near the bottom of the vessel for the feed vapors, and the ends of the vessel are constructed so as to join with conduits 104 and 105 at the top and bottom respectively for the withdrawal of vapors and catalyst.

A hydrocarbon oil boiling between about 300° and 600° F. is heated in any suitable manner to a temperature of about 900° to 1000° F. and vaporized. The vapors are introduced through inlet 103 into the vessel 101 and pass upwardly therethrough, suitably at a velocity of about 6 feet per second as determined by the diameter of the vessel. The pressure existing in vessel 101 is preferably between about 30 and 150 pounds per square inch.

The feed vapors contain approximately equal proportions of 300°–450° F. boiling point material and 450°–600° F. boiling point material, which are to be converted by means of a reforming and a cracking catalyst respectively. The reforming catalyst to be used will convert approximately three times as much of the 300–450° F. stock before becoming inactive as the chosen cracking catalyst will convert of the 450°–600° F. stock. It is known, however, that approximately twice as much reforming catalyst as cracking catalyst must be present in the conversion zone to effect conversion of the lighter stock at the same rate as the heavier stock.

In the instant embodiment, we introduce the two catalysts in admixture one with the other through the catalyst inlet 102, and withdraw the mixture through the conduit 105. A rotary valve or star feeder 106 minimizes the escape of vapors along with the catalyst, but a series of locks can be inserted in conduit 105 to assist the valve 106 in this respect if desired. The upward velocity of the vapors through vessel 101 is 6 feet per second and we adjust the settling rate of the reforming catalyst to be 6½ feet per second and that of the cracking catalyst to be 9 feet per second. Both catalysts will, therefore, settle in a direction opposite to that taken by the vapors, the resultant velocities of the catalysts being ½ foot per second for the reforming catalyst and 3 feet per second for the cracking catalyst.

The mixture of catalysts introduced through inlet 102 will consist of 75% cracking catalyst and 25% reforming catalyst, this proportion being fixed solely by the lives of the catalysts; that is, for equal amounts of oil converted, the amount of cracking catalyst rendered inactive will be three times the amount of reforming catalyst rendered inactive. For every pound of reforming catalyst introduced, there will be 3 pounds of cracking catalyst introduced. The cracking catalyst travels the length of the vessel 101 six times as fast as the reforming catalyst, however, so there will be in the vessel at all times twice as much of the latter as of the former. The actual length of the vessel 101 and the amounts of catalyst instantaneously present therein will of course be dependent upon the vapor throughput and the actual activities of the catalysts employed.

It will be seen that by the method of our invention it is possible to proportion the quantities of catalyst in the conversion zone in accordance with the relative activities of the catalysts so that each can be allowed to effect any desired amount of conversion. For example, it might equally well have been assumed that the feed stock contained twice as much low-boiling material as high-boiling material, in which case the reforming catalyst would have had to be replaced twice as rapidly and would have had to be present in twice as large an amount as in the example given. Such a result could be obtained by making the catalyst mixture of two parts of reforming catalyst to three parts of cracking catalyst and making the actual movement of the cracking catalyst only three times as rapid as that of the reforming catalyst, say by the use of particles having settling rates of 9 and 7 feet per second, respectively.

In order to establish the desired settling rates for the catalysts it will usually be sufficient to estimate the sizes of the particles which will have such rates by means of theoretical equations, employing Stokes' or Newton's law, and to adjust the sizes of the particles to the estimated dimensions by grinding and screening or air classification. In certain cases it may be desirable to perform a few simple experiments in order to evaluate the unknown factors such as the effect of the shape of the particles, before beginning of operation, but ordinarily these factors can be compensated for as operation proceeds. In an embodiment of the invention yet to be described, such compensation can be effected without resizing the particles owing to the possibility of varying the lengths of the paths of the catalysts in the reaction zone.

In the event that it is necessary to employ relatively high vapor velocities in a conversion zone, which would in turn necessitate relatively large particles of catalyst to obtain desired rates of movement with the catalyst-down flow arrangement of Figure 1, then we preferably employ a catalyst upflow arrangement as shown in Figure 2; this arrangement differs from the first chiefly in that the catalysts leave the conversion zone while suspended in the vapors and must be separated therefrom in a cyclone or other suitable device. In Figure 2, the catalysts are introduced into vessel 201 near the bottom via inlet 202, vapors enter through the lower conduit 203, and leave through upper conduit 204 whence they and the catalysts suspended therein pass immediately to a suitable separating device.

In the arrangement of Figure 2, the settling rates and vapor velocity are subtracted as before; the lesser from the greater, to obtain absolute catalyst velocities. For example, to produce the absolute velocities of ½ foot and 3 feet per second of the first example, using a vapor velocity of 8 feet per second, the respective settling rates would be 7½ feet and 5 feet per second, as compared to 8½ feet and 11 feet per second if the catalyst downflow were used.

In the examples given thus far the two catalysts are sized to give settling rates which are either both higher or both lower than the velocity of the gas. This is not a necessary condition of our invention, however, as shown by the arrangement of Figure 3. In Figure 3, 301 is a vessel as in Figures 1 and 2 provided with a vapor inlet 303 near the bottom portion thereof. Catalyst particles having a settling rate greater than the velocity of the vapors flowing upwardly through 301 are introduced near the top via inlet 307, while catalyst particles having a settling rate less than the vapor velocity are introduced through either of the inlets 302 or 308 near the bottom and middle portions of the vessel respectively. The downflowing catalyst from inlet 307 is withdrawn through valve 306 and conduit 305 at the bottom, while the upflowing catalyst from either inlet 302 or 308 passes out in suspension via conduit 304, whence it passes immediately to a suitable separator. Exemplary settling rates for the arrangement of Figure 3 to obtain a 3/1 absolute velocity ratio, assuming a velocity of 6 feet per second, would be 7 feet per second for the downflow catalyst and 3 feet per second for the upflow catalyst. It will be seen that the arrangement of Figure 3 is particularly advantageous in that it enables the use of particles of widely divergent settling rates. Assuming that the two catalysts are of about equal density, this would permit the use of widely divergent particle sizes and minimize the tendency of the large particles to degrade and follow the path of the smaller ones. Another advantage of this third arrangement is that it enables reasonably similar size particles to be employed when the densities of the two catalysts are very different, i. e. by letting the heavy catalyst flow down and the light catalyst flow up.

Foremost of the advantages however, is the opportunity afforded by the third arrangement to vary zonal quantities without resizing the catalysts. Thus by shifting the point of introduction of the upflowing catalyst from the lower inlet 302 to the upper inlet 308 the path of that catalyst and hence the quantity of it instantaneously in contact with the vapor would be reduced by an amount dependent upon the distance between the two inlets. While only two inlets have been shown it is quite feasible to provide a series of inlets at spaced intervals along the vessel 301, any of which could be chosen after operation has been commenced to compensate for errors in the estimated settling rate of the upflowing catalyst. Similarly, a plurality of inlets such as 307 could be provided for varying the point of introduction of the downflowing catalyst.

The three arrangements thus far described are all directed to the promotion of two reactions co-extensively in a common reaction zone. Our invention is not limited to the co-extensive feature, however, for it may be equally well applied to reactions which are desired to take place consecutively. An arrangement suitable for such a case is shown in Figure 4, in which 401 is a converter vessel provided with a vapor inlet 403, a catalyst withdrawal conduit 405 with vapor lock valve 406, and two catalyst inlets 402 and 407 positioned intermediate of the vessel's length. Up and downflowing catalysts of appropriate particle size are introduced through the inlets 402 and 407, and travel in opposite directions. The vapors first contact the downflowing catalyst in the lower half of the vessel and then the upflowing catalyst in the upper half of the vessel, whence they issue via conduit 404 carrying the upflowing catalyst in suspension, and pass to a suitable separator.

The arrangements of Figures 3 and 4 have the advantage that the two catalysts leave the vessels separately and can be given separate regenerative treatments if desired.

While the method of our invention has been described with particular reference to the contacting of catalysts with vapors to be converted, it will readily be understood that it may be of utility in connection with analogous process steps. For example, the regeneration of catalysts by contacting them with a regenerative gas is itself an operation wherein our invention finds utility. The cracking and reforming catalysts referred to in the example hereinbefore given are both suitably regenerated by combustion of accumulated carbonaceous contaminants in a stream of oxygen-containing gas. Because of the difference in the sizes of the catalyst particles and the type of carbon deposited thereon the removal of carbon proceeds at a different rate on each, and different times of contact with the oxidizing gas are accordingly necessary. In order to obtain the required contact times in a suspended regeneration zone, the particle sizes of the catalysts being already fixed, we vary the velocity of the regeneration gas so as to obtain desired rates of absolute movement. For example, supposing that the catalyst mixture referred to in connection with the description of Figure 1 is to be regenerated, and that to obtain suitable regeneration times the cracking catalyst must move through the regeneration converter (of which the vessel 101 may be illustrative) at a rate equal to 3.5 times that of the reforming catalyst. The settling rates are 9 feet per second and 6½ feet per second respectively. By making the velocity of the regeneration gas 5½ feet per second in an arrangement such as Figure 1, the absolute movements of the two catalysts will become 1 foot per second and 3½ feet per second, which rates are in the required ratio. Such utilization of our invention, while not universally applicable as when the particle sizes can be chosen with reference to the operation at hand, is nevertheless available in many cases.

It should be understood that the representations of conversion vessels employed in the drawing are diagrammatic only, and do not necessarily resemble the equipment which is preferably used. In actual practice, for example, we prefer to introduce an upflowing catalyst stream somewhat above the point at which the carrying vapor enters, rather than at the same level as in Figure 3, inlets 302 and 303. Likewise, it is not absolutely necessary that the path of the vapor through the converter be exactly vertical, so long as its vertical projection is sufficiently great to permit substantial movement of catalysts by the opposing forces of gravity and gaseous friction. The operating conditions and settling rates mentioned by way of illustration are not necessarily those which would be preferred in an actual process, as the introduction of actual process conditions would not aid in the exposition of our invention and would needlessly complicate the examples. In certain cases such as those to which the arrangement of Figure 4 is adapted it may be found advantageous to maintain different vapor velocities in different portions of a converter vessel, as for example by tapering the diameter thereof or enlarging it at a given point. Such variation is within the scope of our invention.

The range within which we may vary particle sizes in order to achieve the results of our invention is quite broad. Strictly speaking, we may employ particles of any diameter above that at which settling ceases due to the Brownian movement, but in practice we seldom if ever use particles appreciably smaller than 400 mesh. The upper limit of particle size suitable for practicing our invention is not limited by any natural phenomenon, but it is unlikely that diameters greater than an eighth to a quarter of an inch would ever be indicated. The range of settling rates which may be obtained within the above range of particle sizes is very broad, extending from about one-quarter of an inch per second to at least twenty or thirty feet per second.

It will be understood that the method of our invention is useful when two catalysts of different densities are desired to contact simultaneously and identically with a vapor stream. Suitable adjustment of particle sizes will impart equal settling rates to the two catalysts, so that they will not behave differently when in suspension.

In some instances it is possible to utilize our invention in a catalytic process when, in the strictest sense, only one catalyst is to be employed. Such a situation is met with when for some reason the density or diameter of catalyst particles and hence their settling rate is altered as catalysis proceeds. It may be said that in such a case only one kind of catalyst is actually introduced into a converter but that two kinds exist therein. It is then possible to move the altered particles differently than those which have yet to be altered. This can be achieved by proportioning the vapor velocity to the settling rate of a particle which has been altered to a given extent, such that particles which have been altered more than that will move in one direction and those which have been altered less will move in another direction. In the catalytic cracking of hydrocarbon oils, where carbon is deposited upon catalyst particles suspended in oil vapors, the carbon deposit increases the size and weight of the catalyst particles and at the same time impairs their effectiveness, making it desirable that they be removed and regenerated by combustion of the carbon. It is not to be supposed that the accumulation of carbon will interfere with the motion imposed upon cracking catalyst particles in the example of Figure 1, for it is not proposed that the carbon shall be allowed to accumulate sufficiently in that process to alter the settling rate of the particles appreciably; that is, the catalyst is preferably maintained at a high activity level. If desired, however, a cracking catalyst can be allowed to exhaust its activity relatively completely in a conversion zone, and thereby acquire a sufficiently heavy deposit of carbon to make possible its selective withdrawal as a result of its altered settling rate.

While the field of vapor phase catalysis is one in which such variables as contact time, contact ratio and zonal quantity in suspended contacting are of the greatest importance, it lies entirely within the broader field of solid-gas contacting, and our invention may be applied to any solid-gas contacting process wherein the aforementioned contacting variables must be individually controlled with respect to two solids in a single contacting zone.

It will be seen that all the above described embodiments of our invention have in common the utilization of a fundamental principle, viz., that the absolute motion relative to fixed points of a particle suspended in a gas is a function of the settling rate of the particle in the gas and the rate and direction of movement of the gas. Our invention encompasses the employment of this principle in connection with the simultaneous contacting of two kinds of particles with a gas in a common contacting zone whereby the rate, direction and distance of absolute movement of the particles are controlled by regulation of particle settling rate and gas motion, the particle settling rate being in turn controlled by regulating particle diameter.

Having now described our invention and the manner in which it may be utilized, we claim:

1. A method of conducting catalytic vapor-phase conversions wherein two separate and different solid catalysts are employed which comprises continuously passing vapors to be converted upwardly through a conversion zone, continuously introducing two separate and different subdivided solid catalysts each of said catalysts being adapted to catalyze a distinctly different reaction into said zone to catalyze the conversion of said vapors, withdrawing conversion products from said zone, each of said catalysts being characterized by its own substantially uniform particle size and particle settling rate, continuously withdrawing at least partially inactivated catalysts from said zone after movement thereof through said zone by the resultant of the gravitational force and the frictional resistance of said vapors, the absolute movements of said catalysts in said zone being different because of a difference in the settling rates of the particles into which the two catalysts are subdivided.

2. A method as in claim 1 wherein the two catalysts move in opposite directions through said zone.

3. A method as in claim 1 wherein the two catalysts move in opposite directions and for different distances in said zone.

4. A method of preparing high octane motor fuel from a hydrocarbon oil containing naphtha and heavier fractions which comprises vaporizing said oil and passing the vapors at a temperature between 850° and 1100° F. through a conversion zone in an upward direction, introducing a subdivided solid catalyst of substantially uniform particle size and of the reforming-dehydrogenation type into said zone, introducing a separate subdivided solid cracking catalyst of substantially uniform particle size into said zone, allowing each of said catalysts to move through said zone separately as impelled by the resultant of the gravitational force and the frictional resistance of the oil vapors, withdrawing conversion products from said zone, withdrawing said catalysts from said zone after they have undergone an impairment of their activity, and individually maintaining desired quantities of said catalysts in said zone by adjustment of the size of the particles into which each of said catalysts are subdivided, whereby the absolute movement of said catalysts in said zone are predetermined.

5. A method as in claim 4 wherein the two catalysts move in opposite directions through said zone.

6. A method as in claim 4 wherein the two catalysts move in opposite directions and for different distances in said zone.

GEORGE D. CREELMAN.
JOHN F. CROWTHER.